United States Patent
Peterson

(10) Patent No.: US 7,996,962 B2
(45) Date of Patent: Aug. 16, 2011

(54) ADJUSTABLE LENGTH ROPE CLIP SYSTEM

(75) Inventor: Mark Peterson, Braham, MN (US)

(73) Assignee: Smart Tie, LLC, Hugo, MN (US)

( * ) Notice: Subject to any disclaimer, the term of this patent is extended or adjusted under 35 U.S.C. 154(b) by 660 days.

(21) Appl. No.: 11/904,378

(22) Filed: Sep. 27, 2007

(65) Prior Publication Data

US 2008/0016659 A1    Jan. 24, 2008

(51) Int. Cl.
*F16G 11/00* (2006.01)

(52) U.S. Cl. .......... 24/165; 24/169; 24/129 R; 24/600.9; 24/609

(58) Field of Classification Search .................. None
See application file for complete search history.

(56) References Cited

U.S. PATENT DOCUMENTS

| | | | | |
|---|---|---|---|---|
| 413,135 | A | * | 10/1889 | Dennis ........................ 24/129 R |
| 524,872 | A | * | 8/1894 | Stephen ........................ 24/347 |
| D391,473 | S | * | 3/1998 | Striebel ........................ D8/367 |
| D455,642 | S | * | 4/2002 | Kelleghan ........................ D8/367 |
| D466,791 | S | * | 12/2002 | Kelleghan ........................ D8/356 |
| D500,950 | S | * | 1/2005 | Kelleghan ........................ D8/356 |
| D520,345 | S | * | 5/2006 | Kelleghan ........................ D8/356 |
| D521,362 | S | * | 5/2006 | Kelleghan ........................ D8/356 |
| D608,184 | S | * | 1/2010 | Kelleghan ........................ D8/356 |
| D612,710 | S | * | 3/2010 | Kelleghan ........................ D8/356 |
| D635,446 | S | * | 4/2011 | Baca et al. ........................ D8/356 |

* cited by examiner

*Primary Examiner* — Jack W. Lavinder
(74) *Attorney, Agent, or Firm* — Janet P. Schafer; Sherrill Law Offices, PLLC

(57) ABSTRACT

An adjustable length rope clip for tethering an animal or other object on a lead rope providing a predetermined length of rope to be released when pressure is applied. The rope clip for attachment to a lead rope, the clip having a arm element for positioning a lead rope, or the like on the clip, providing means for retaining a predetermined length of rope, permitting the rope to be easily manually adjusted in length about the rope clip and permitting the a predetermined length of rope to be selectively released in a controlled manner upon application of pressure by the animal. The clip system providing means for re-positioning an attached animal, or the like, without the addition of other devices and without untethering the animal, even momentarily.

12 Claims, 15 Drawing Sheets

FIG. 5A
FIG. 5B
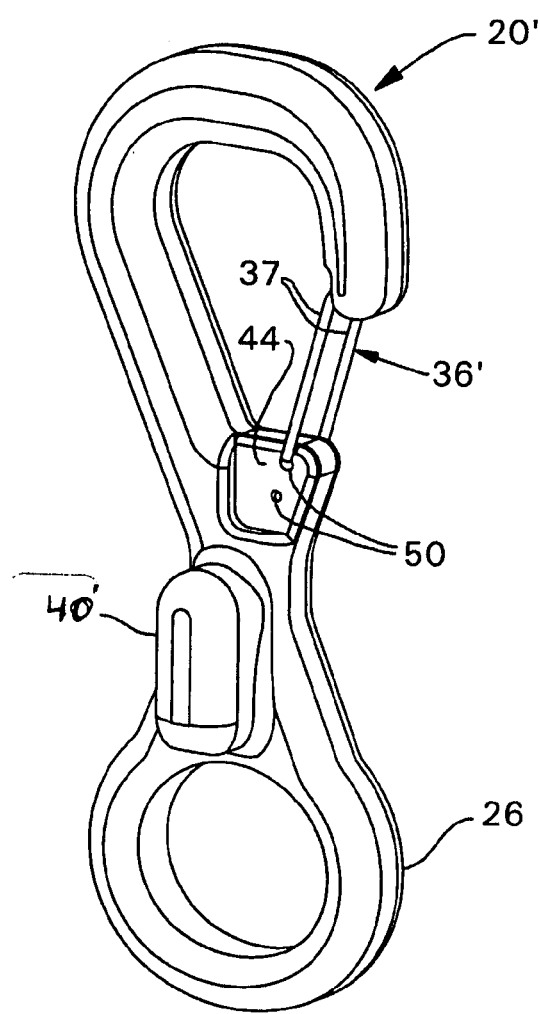
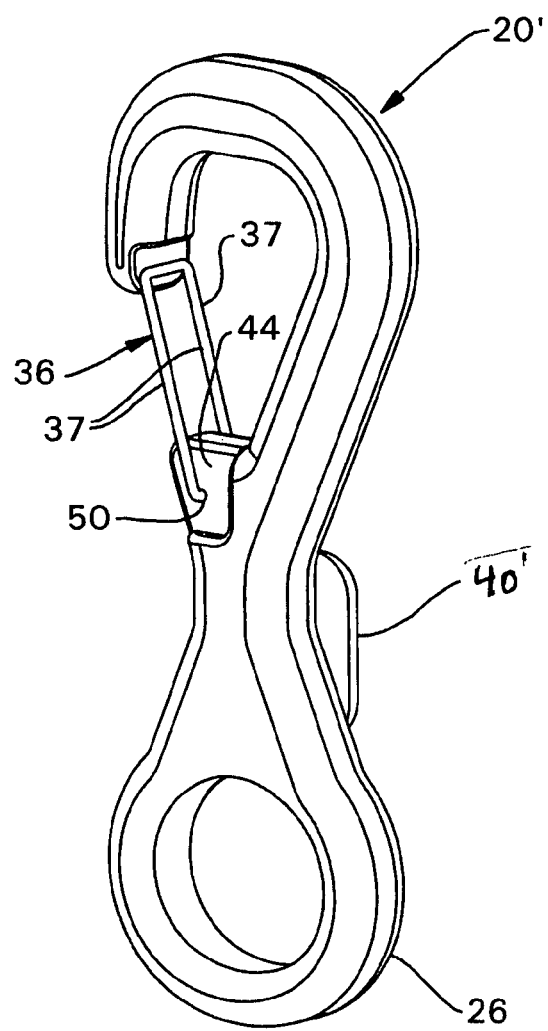

FIG. 6A
FIG. 6B
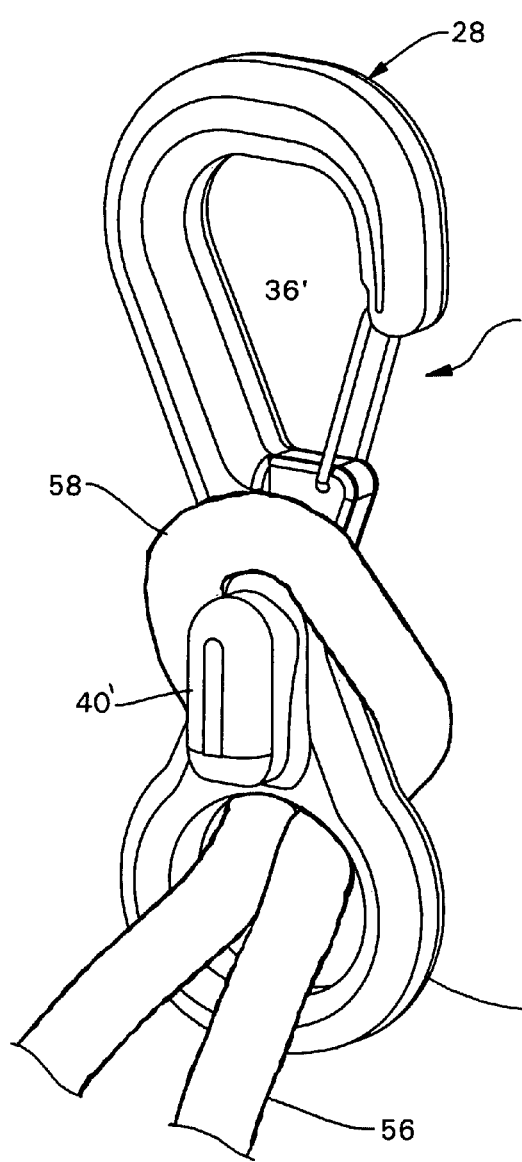
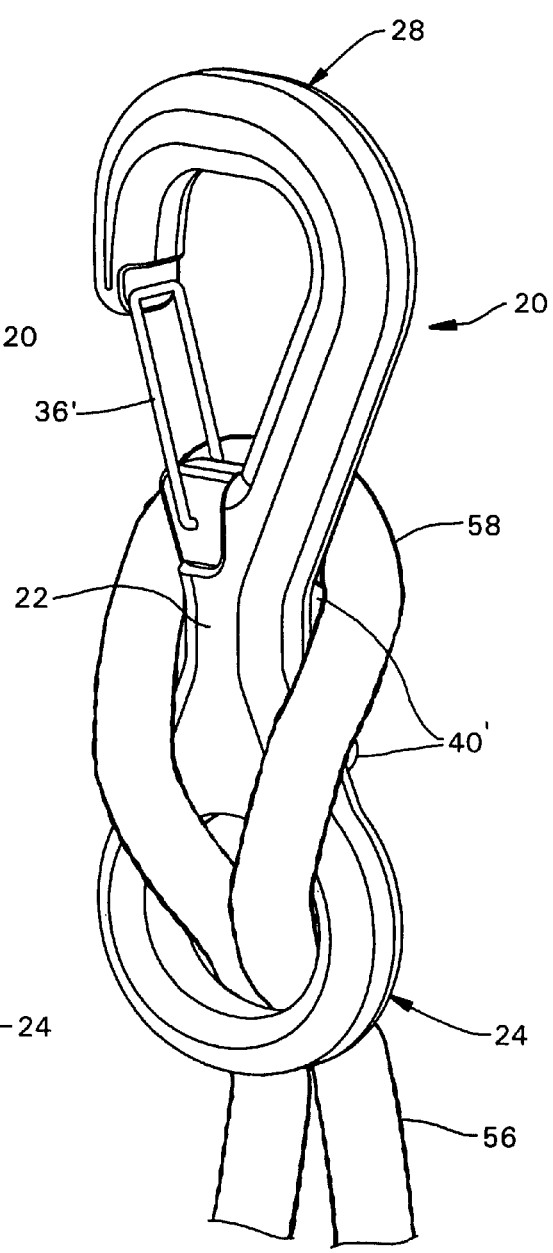

FIG. 7A
FIG. 7B
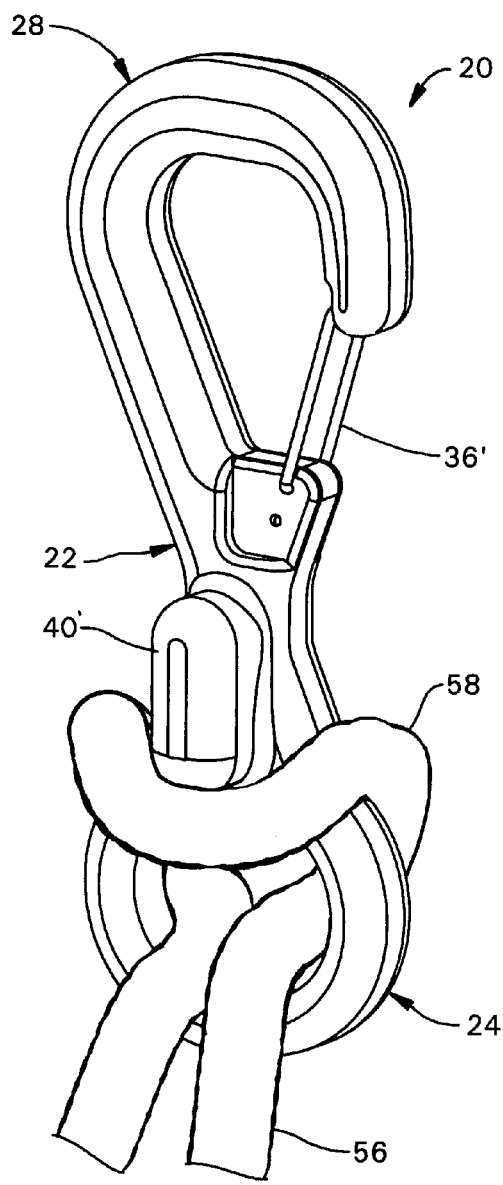
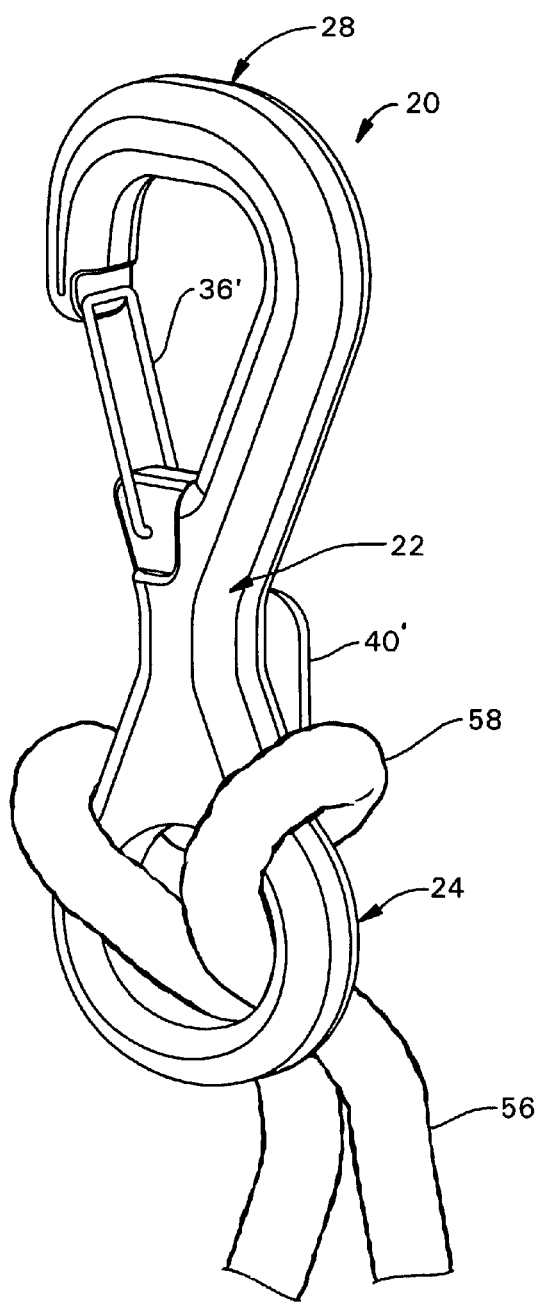

FIG. 8A
FIG. 8B
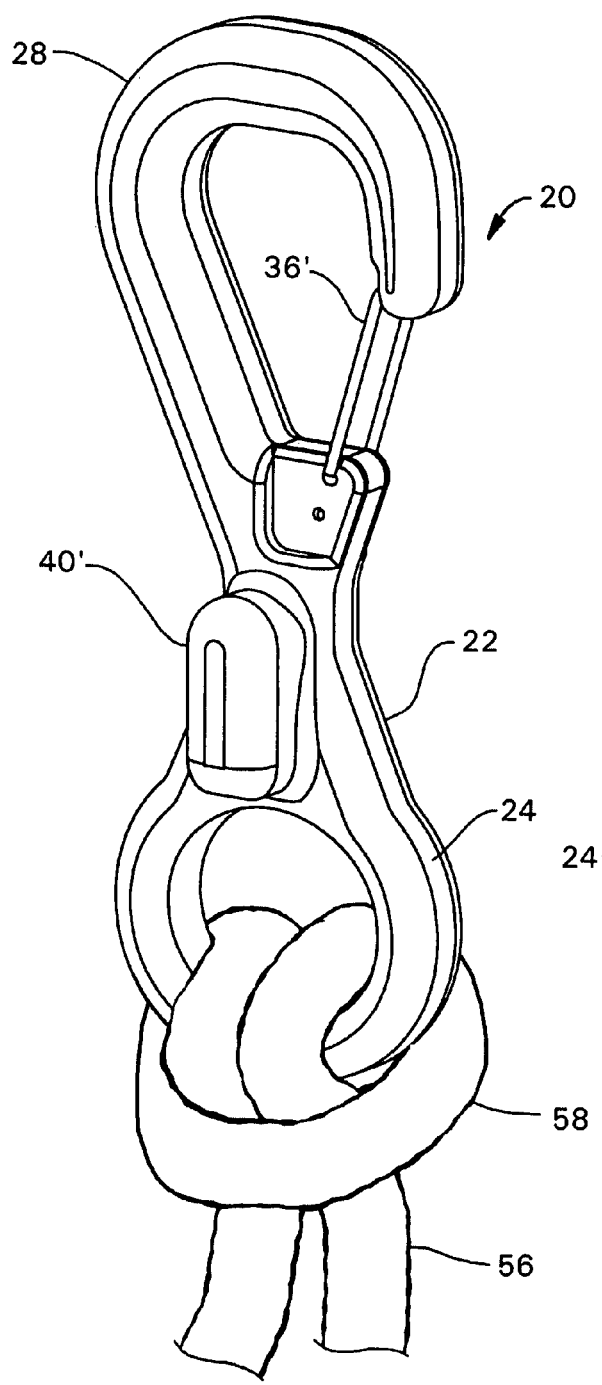
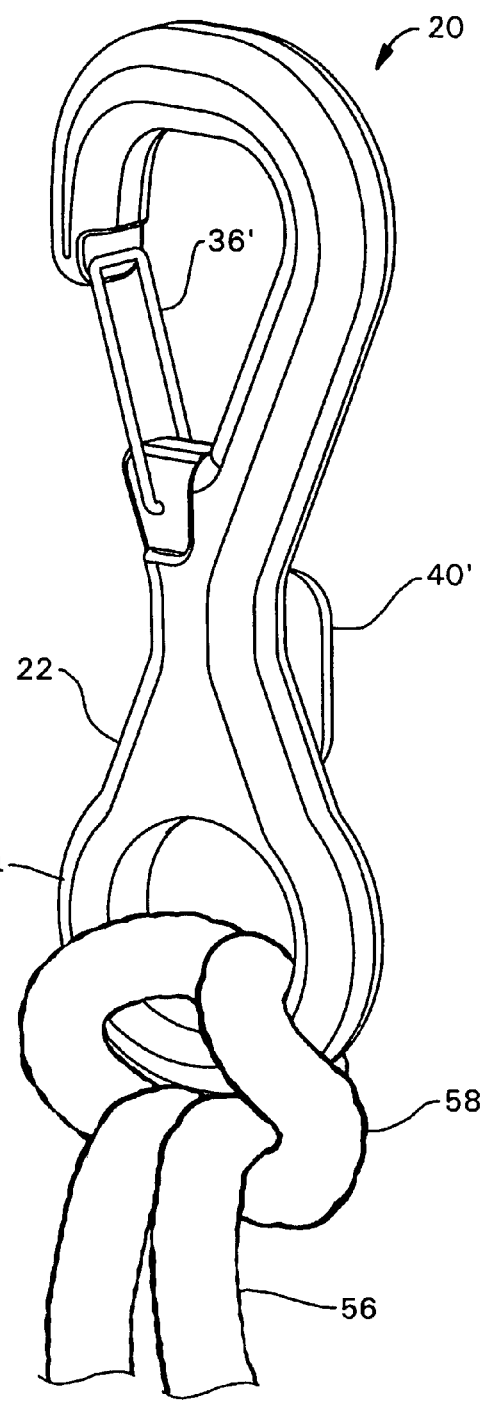

ADJUSTABLE LENGTH ROPE CLIP SYSTEM

BACKGROUND

The present invention is directed generally to tethering systems. In particular, the present invention relates to a rope clip for attachment to a lead rope, the clip having an arm element for positioning a lead rope, or the like, on the rope clip, providing means for retaining a predetermined length of rope, permitting the rope to be easily adjusted in length and permitting the predetermined length of rope to be selectively released in a controlled manner upon application of pressure. The clip system provides means for re-positioning an attached animal, or the like, without the addition of other devices and without un-tethering the animal, even momentarily.

Animal tying systems have been used previously. Examples of such animal tying systems are:

| Name | Patent No. |
| --- | --- |
| Luebke et al. | 1,476,627 |
| Nelson | 5,366,327 |
| Blocker | 6,684,613 |

Several U.S. Patents describe rope fasteners having stationary arm elements around which rope is wound, including Anderson U.S. Pat. No. 904,747, Finn U.S. Pat. No. 1,714,770, Koch U.S. Pat. No. 2,370,358 and Sova U.S. Pat. No. 2,441,336.

SUMMARY

The present invention provides an adjustable lengthy rope clip, having a handle element for attachment to a lead rope, or the like, and having a spring clip for temporary attachment of the lead rope and the adjustable length rope clip device as a unit to a fixed object. The adjustable length rope clip has at least one arm element extending from the body of the device, the arm element for positioning a lead rope, or the like, on the adjustable length rope clip. The adjustable length rope clip may be attached to the lead rope in one of three positions: a first position providing means for adjusting a length of rope. In a second position, the clip permits a slow release of the rope upon application of pressure, for example to prevent a spooked horse from getting injured while adjusting to a training program of the horse. The adjustable length rope clip may be attached to the lead rope in this second position on the at least one arm element to provide means for retaining a predetermined length of rope and permitting it to be selectively released upon application of pressure. The adjustable length rope clip, positioned in the second position, is especially helpful in a situation where the horse is tied to a holding location, such as a trailer, and falls-down thereby putting a relatively great amount of pull on the rope. The slow release of the lead rope prevents the attached horse from being strangled When the adjustable length rope clip is attached to the lead rope in the third position on the at least one arm element, the rope is locked onto the adjustable length rope clip.

The adjustable length rope clip system allows for easily moving the lead rope between these three positions about the clip by releasing pressure on the rope and manually re-positioning the rope about the at least one arm element on the adjustable length rope clip.

The clip system further providing means for re-positioning the animal tethered on a lead rope without the addition of other devices and without un-tethering the animal, even momentarily. The animal is lead by the lead rope, with the attached rope clip to a new location and the rope clip re-attached to a different fixed object, such as moving from a cross-tie to a trailer.

BRIEF DESCRIPTION OF THE DRAWINGS

Understanding of the invention will be enhanced by referring to the accompanying drawings, in which like numbers refer to like parts in the several views and in which:

FIG. 5A is a side view of the device of an embodiment having a single generally oval-shaped arm element mounted on the front side of the device, a generally circular-shaped handle, and a length of wire bent to form a spring element;

FIG. 5B being the rear side view of this embodiment;

FIG. 6A is a front side view of the device of FIG. 5 with a lead rope held in a first position of use above the arm element of the device where the lead rope would be automatically released a predetermined length upon application of a generally lesser amount of pressure;

FIG. 6B being the rear side view of the embodiment of FIG. 6A, with the lead rope shown positioned about the device of this invention;

FIG. 7A is a side view of the device of FIG. 5 with a lead rope held in a second position of use below the arm element of the device where the lead rope would be automatically released a predetermined length upon application of a relatively greater amount of pressure;

FIG. 7B being the rear side view of the embodiment of FIG. 7A, with the lead rope shown positioned about the device of this invention;

FIG. 8A is a side view of the device of FIG. 5 with the lead rope is shown in a position of use locked about the handle portion of the device;

FIG. 8B being the rear side view of the embodiment of FIG. 8A with the lead rope shown in a third position of use locked about the handle portion of the device;

DETAILED DESCRIPTION OF THE CURRENTLY PREFERRED EMBODIMENTS

Figure 1A:
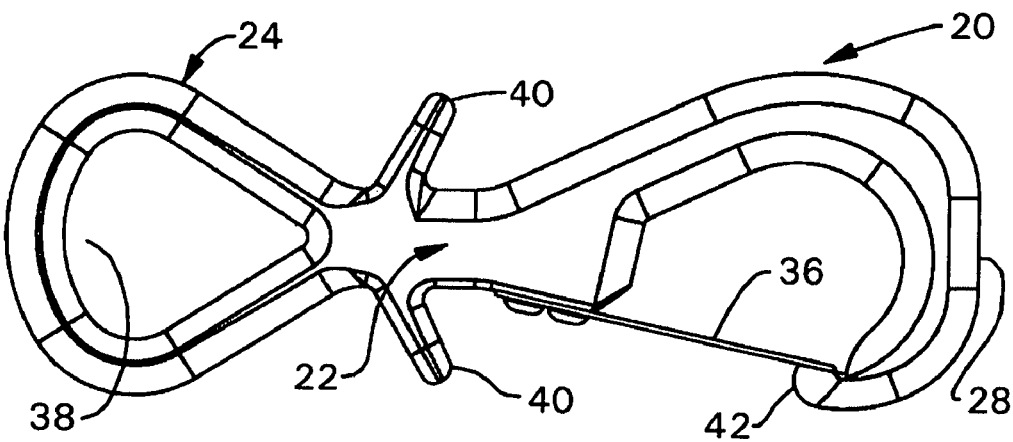
FIG. 1A is a side view of the device of the invention, with a pair of element arms, one each on the proximal surface and the distal surface of the device and with a solid spring element.

An adjustable length rope clip, generally indicated at 20, in FIG. 1 and 20', 20", 20"', 20"", 20""' in the following figures, for use with a lead rope or the like as an additional device for attachment to a lead rope. The adjustable length rope clip 20 has a spring element 36 as a clip for the temporary attachment of the lead rope mounted device with attached, animal or object tethered by a lead rope, to a fixed object. The adjustable length rope clip 20 also has at least one arm element 40 formed on the body 22 thereof for the positioning of a lead Rope, or the like, on the adjustable length rope clip 20, the positioning of the lead rope on the adjustable length rope clip 20 in one of three positions, a first position above the arm element 40 providing means for selectively releasing a length of rope to adjust the length. The adjustable length rope clip 20 in a second position permits the slow release of the rope which prevents the horse from getting injured if spooked while adjusting to the training program of the horse. In this second position, with the rope below an arm element on the adjustable length rope clip 20, pressure is required to release a predetermined length of rope through the device and permitting the lead rope to be selectively released. Such a situation could result from a horse being tied to a holding location such as a trailer and falling down putting a great amount of pull on the rope. The slow release prevents the attached horse from being strangled. In the third position on the adjustable length rope clip 20, the lead rope is locked onto the adjustable length rope clip 20. It is understood that the lead rope may be easily manually positioned about the arm element of the rope clip device upon release of pressure upon the lead rope.

The adjustable length rope clip 20 system further providing means for re-positioning the attached animal without the addition of other devices and without un-tethering the animal from the lead rope, even momentarily. The animal is lead by the lead rope in the normal manner, with the attached adjustable length rope clip 20 positioned on the lead rope, to a new location and the adjustable length rope clip 20 re-attached to a different fixed object, such as moving from a cross-tie to a trailer and the animal remains tethered to the lead rope throughout.

A variety of adjustable length rope clips 20 have been tested. Each has a body 22 having a hook end 28, a handle end 24, at least one arm element 40 mounted on the body 22 midway between the hook end 28 and the handle end 24, and a spring element 36 mounted for use on the hook end 28 to close the hook.

Figure 1B:
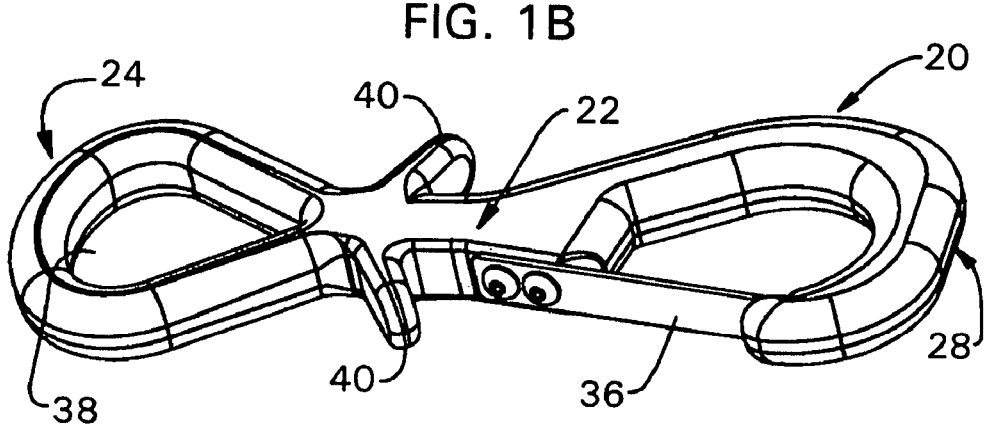
FIG. 1B is a side perspective view of device of FIG. 1A.
Figure 1C:
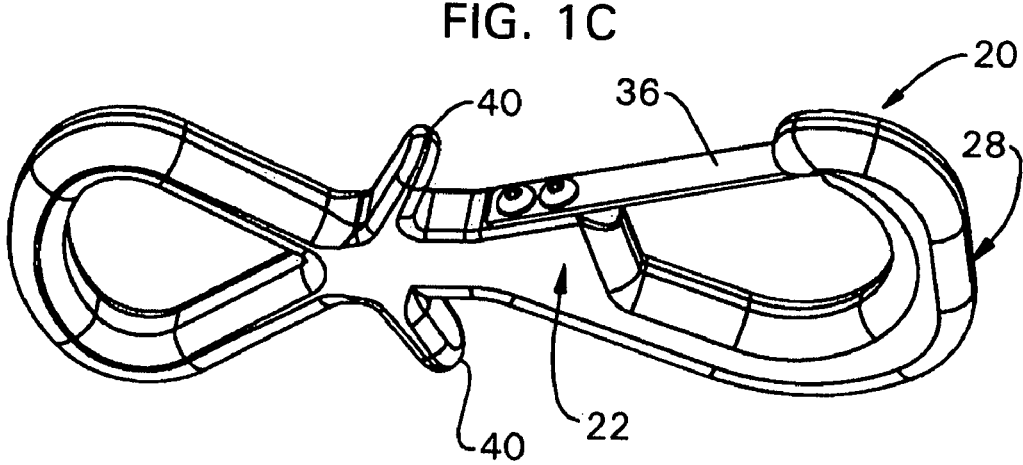
FIG. 1C is a back side view of the device of FIG. 1A.

FIG. 1A-FIG. 1C illustrates a device 20 of the invention having a body 22 with a handle 24, a hook end 28, with a pair of element arms 40 positioned in between, one each on a proximal surface 30 and a distal surface 34 of the device 20. Also shown is a spring element 36. The body 22 is, in actual use conditions, of aluminum, however other rigid materials including other metals and ceramics could be used. The body 22 of the device is of uniform construction with a spring element 36 mounted thereon. In actual use conditions, a stainless steel spring has been used although other resilient materials could also be used. The spring element 36 is positioned to close the hook end 28 of the device by catching an end portion of the spring element by a lip 42 formed on the hook end 28. Handle 24 is shown having a generally triangular shape although other shapes have been used as described hereinafter.

Figure 2A:
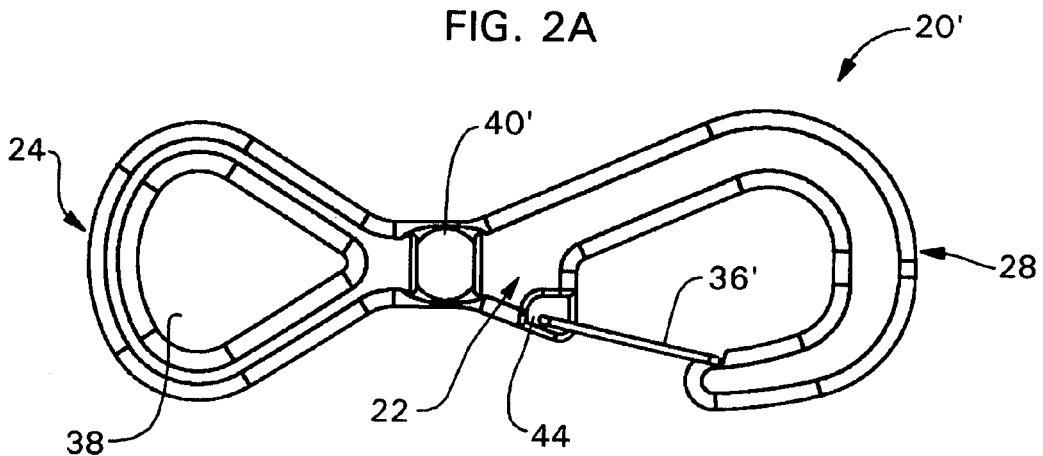
FIG. 2A is a side view of an embodiment having a single arm element on the front side of the device and with a length of wire bent to form a spring element.
Figure 2B:
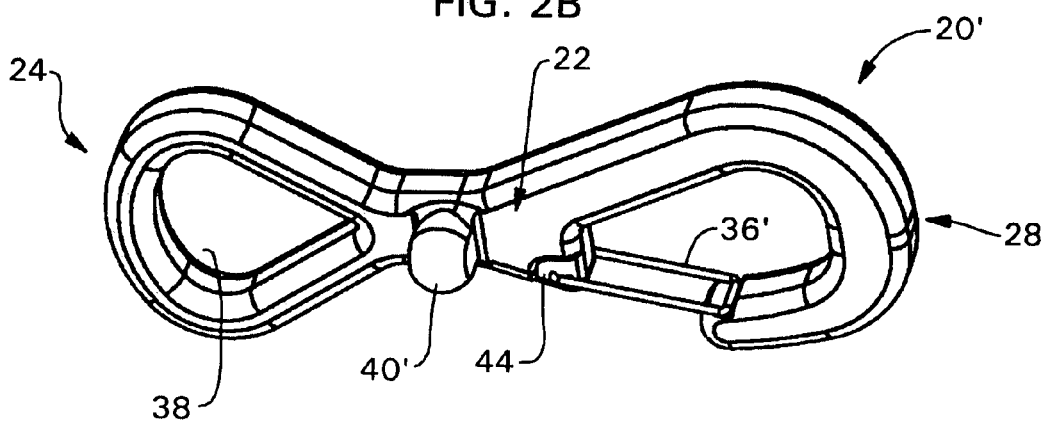
FIG. 2B is a side perspective view of the device of FIG. 2A.
Figure 2C:
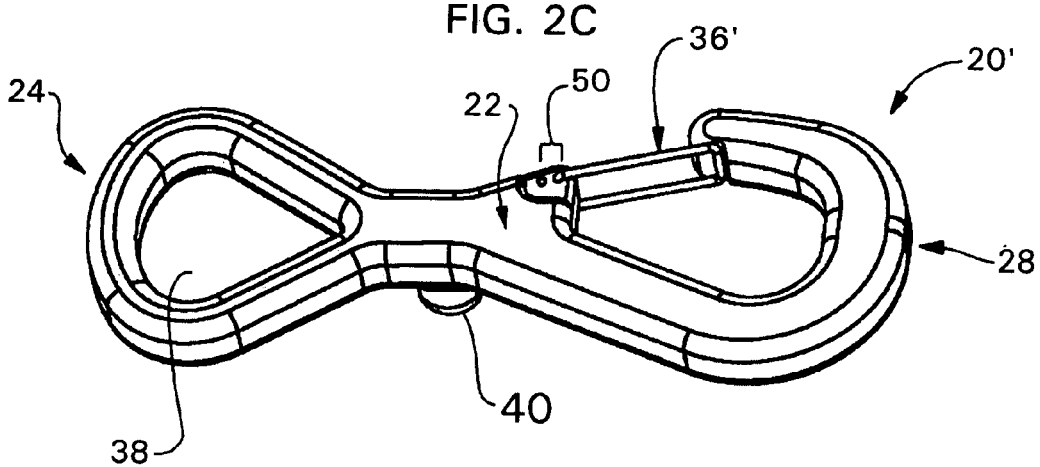
FIG. 2C is a back side view of the device of FIG. 2A.

FIG. 2A-FIG. 2C illustrate an embodiment having a single arm element 40' projecting at a right angle from the body 22 on a first lateral surface 46 of the device 20. This embodiment also is of aluminum one-piece construction having a generally triangular shaped handle. The arm element 40' has a rounded shape with a pair of flattened sides one each toward the hook end and toward the handle end of the device 20. The spring element 36' is a flat wire length of stainless steel shaped generally as a rectangle. The legs of the long sides of the rectangle having different lengths and each leg having a projecting end for receipt by the a pair of bores 50 formed in body 22 at the hook element base 44, shown in detail at FIG. 2C. Each bore 50 receives one leg of the hook spring element 36'. One leg of the spring element is received by upper bore, opposite side receives the opposite leg into a lower bore. Because spring element 36' is positioned on the device so that it is slightly bent by abutting hook element 28, the spring element is thereby "pre-loaded" with tension closing the open end of hook element 28 when in its position of use.

Figure 3A:
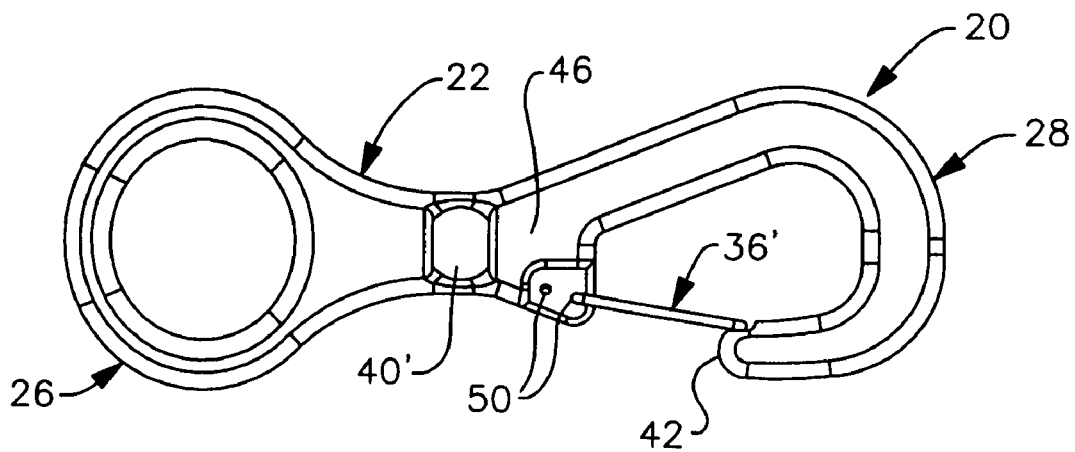
FIG. 3A is a side view of the device of an embodiment having a single arm element on the front side of the device, a round handle element and a length of wire bent to form a spring element.
Figure 3B:
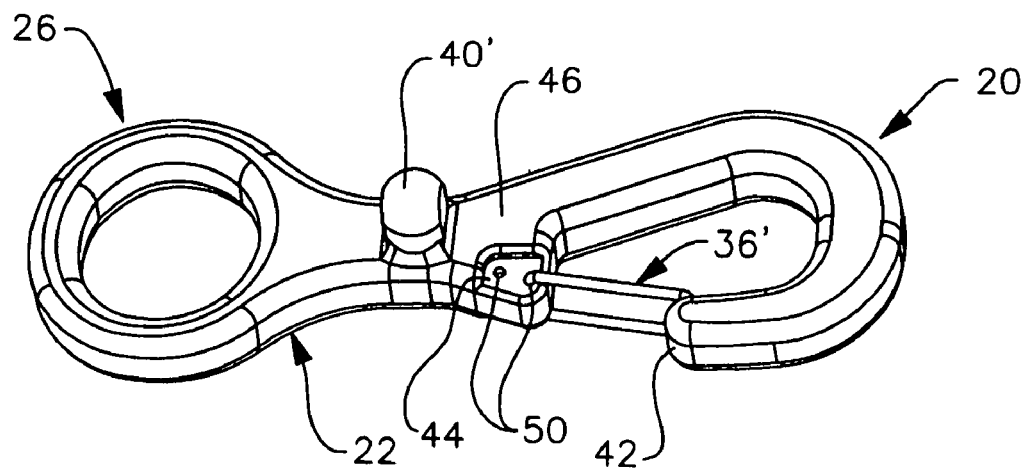
FIG. 3B is a side perspective view of the device of FIG. 3A.
Figure 3C:
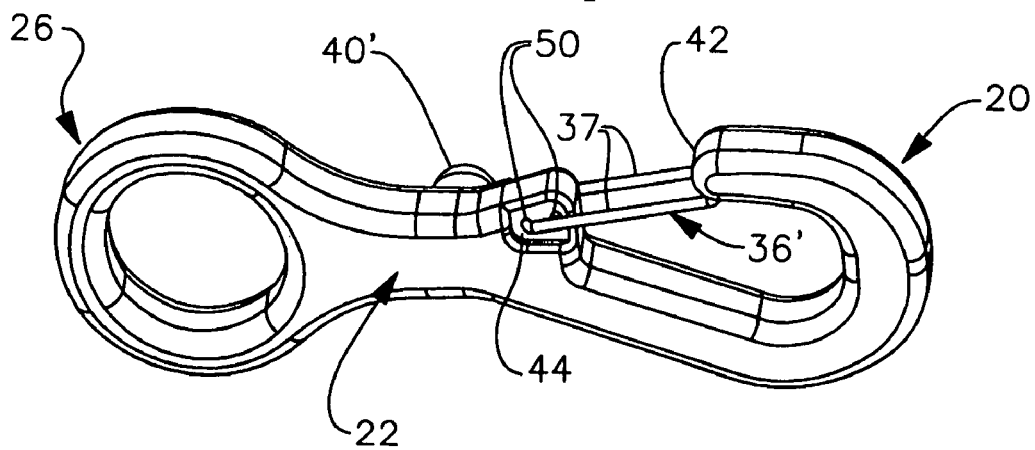
FIG. 3C is a back side view of the device of FIG. 3A.

FIGS. 3A-3C illustrate an embodiment having a single arm element 40', as shown in FIGS. 2A-2C projecting at a right angle from the body 22 on a first lateral surface 46 of the device 20". This embodiment also is of aluminum one-piece construction having a generally circular shaped handle. The arm element 40' has a rounded shape with a pair of flattened sides one each toward the hook end and toward the handle end of the device 20". The spring element 36' is a flat wire length of stainless steel shaped generally as an outline of a rectangle. The legs of the long sides of the rectangle having different lengths and each leg having a projecting end for receipt by the pair of bores 50 formed in the body 22 at the hook element base 44, shown in detail at FIG. 2C. Each bore 50 receives one leg of the hook spring element 36'. One leg of the spring element is received by the upper bore, the opposite bore receives the opposite leg into a lower bore. Because spring element 36' is positioned on the device so that it is slightly bent by the abutting hook element 28, the spring element is thereby "pre-loaded" with tension closing the open end of the hook element 28 when in its position of use.

Figure 4A:
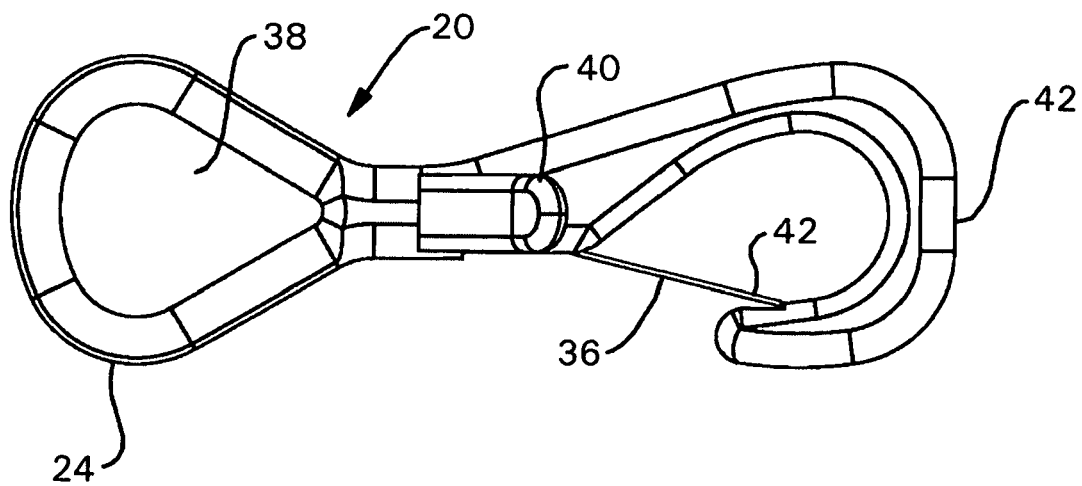
FIG. 4A is a side view of the device of the embodiment having a single arm element mounted on the front side of the device, a generally triangular-shaped handle and a flat spring element.

FIG. 4A is a side view of an embodiment having a single arm element 40, of the type shown at FIG. 1A-C a flattened arm element extending at an angle towards the hook end of the clip 20"', a generally triangular-shaped handle 24 and a solid spring element 36, as shown in FIGS. 1A-C.

Figure 4B:
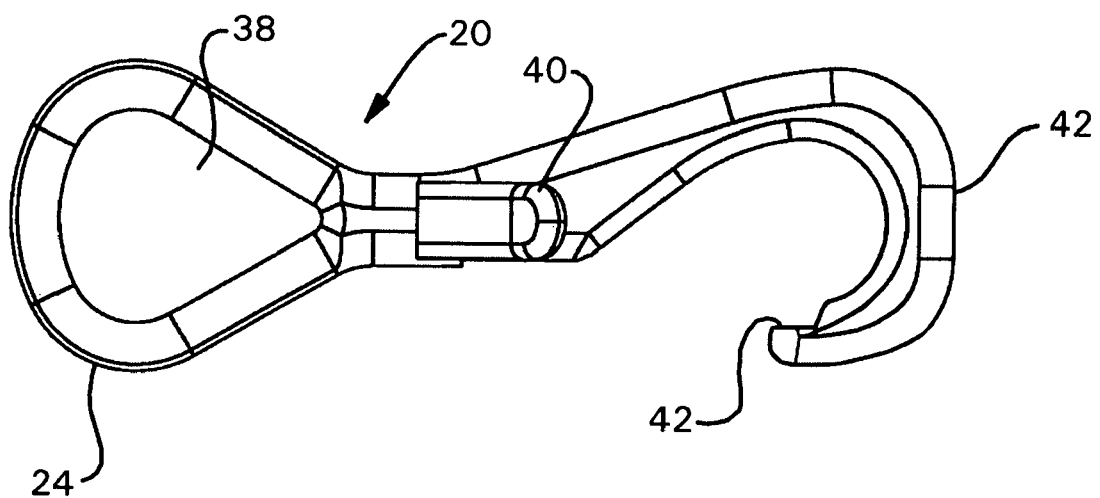
FIG. 4B is a side view of the device of FIG. 4A with the spring element removed for ease of understanding.

FIG. 4B is a side view of the embodiment of FIG. 4A, with the spring element 36 removed.

All embodiments are of aluminum although other rigid material, such as other metals or ceramics, could be used. All embodiments are manufactured and used similarly and have a molded body 22 with a hook end 28 and a handle end 24 with at least one arm element 40 formed approximately in the mid section of the device 20. The handle end 24 of the device is shown with a generally triangular shape or a generally rounded shape, although other shapes could be used, such as a trapezoidal shape and a square shape, among others. The shaped handles have an opening 38 formed therein for receipt of a loop 58 of the lead rope 56.

The arm elements 40, 40', 40", 40''' are shown having different configurations but all position the rope about the device. The flattened angled arm elements 40 of FIGS. 1 and 4 provide frictional griping of the rope to maintain the rope in position about the clip 20, 20'''. The arm elements shown at FIGS. 2, 3 and 5-8 position the lead rope about the rope clip 20. They position the lead rope about the rope clip, 20',20", 20''' in such a way as to prevent a tight loop forming in the lead rope that locks down on the handle 24.

FIG. 6A & B are side views of the device at FIG. 5 with a loop portion 58 of a lead rope 56 shown positioned in a first position above the arm element 40" where pressure would need be applied before the lead rope 56 would be released a predetermined length adjusting the length of the lead rope. The lead rope receives a knot at an end opposite the lead rope shank to prevent the lead rope from being totally released from the device. The animal is attached in the normal manner at the lead rope shank end, not shown. In use, a lead rope 56 is looped through the opening 38 in the handle end 24 of the device, the lead rope loop 58 is positioned above the arm element 40" and held in place by frictional forces. The animal is tethered to a fixed position by means of fastening the hook end of the clip device 20 over a fixed ring or other anchoring device. When the lead rope 56 is positioned in the second position, as illustrated at FIG. 7, a large amount of pressure, applied by the animal backing up strongly or pulling downwardly as in a fall, pulls the lead rope loop 58 the lead rope sliding out slowly a pre-determined length, the lead rope 56 stopped by a knot formed in the end of the rope, permitting the animal to get away from the fright without breaking the lead rope or the halter.

FIG. 6 A & B are side views of the device of FIG. 5 with a loop 58 of the lead rope 56 shown positioned above the arm element 40" in a first position of use where a lesser amount of pressure would need be applied before the lead rope loop 58 would be released to adjust the length. A second position, as shown at FIG. 7A & B, again a lead rope 56 is looped through the opening 38 in the handle end 24 of the device, the lead rope loop 58 is positioned below the arm element 40". In this position, the lead rope 56 slides or is pulled out a pre-determined length, again stopped by the knotted end in the lead rope, not shown, as a result of pressure being put upon the lead rope by the animal tethered thereby.

FIG. 8 is a side view of the device of FIG. 5 with a loop 58 of the lead rope 56 shown in a third position of use where the lead rope loop 58 is locked in position. In use, again a lead rope 56 is looped through the opening 38 in the handle end 24 of the device 22, the lead rope loop 58 is moved over the look end and is positioned only about the handle end 24 of the device. An important feature is that the lead rope 56 may be easily re-positioned in any of the three positions shown at FIGS. 6, 7, & 8 by releasing the pressure on the lead rope and manually moving the loop 58 of the lead rope 56 between the three positions.

The device of this invention has the ability to tether an animal to a fixed object by releasing the spring element 36 freeing the hook end 28 from the fixed loop or other object and leading the animal to a new position, example in a trailer, without having to removing the lead rope from the animal or attaching another lead rope to the animal.

In use, the animal, or other object, is attached to a lead rope in the normal manner, the lead rope having a knot formed in the end opposite the fastening end, a lead rope loop 58 is made mid-way on the lead rope, the lead rope loop 58 pushed through an opening, or orifice, 38 in the handle 24 of the device 20, front to back. The lead rope loop 58 is slipped over the hook end 28, resulting in the lead rope loop 58 being on the same side of the device 20 as the lead rope entering the opening 38 of the device 20, as shown in FIG. 6-8. In all embodiments, the rope is place in a first position above the arm element 40, as illustrated in FIG. 6 A& B, or the rope is placed in a second position below the arm element 40, as illustrated in FIG. 7A & B, or the rope is placed in a third or locked position about the handle end 24, as illustrated in FIGS. 8A &B.

Figure 9A:
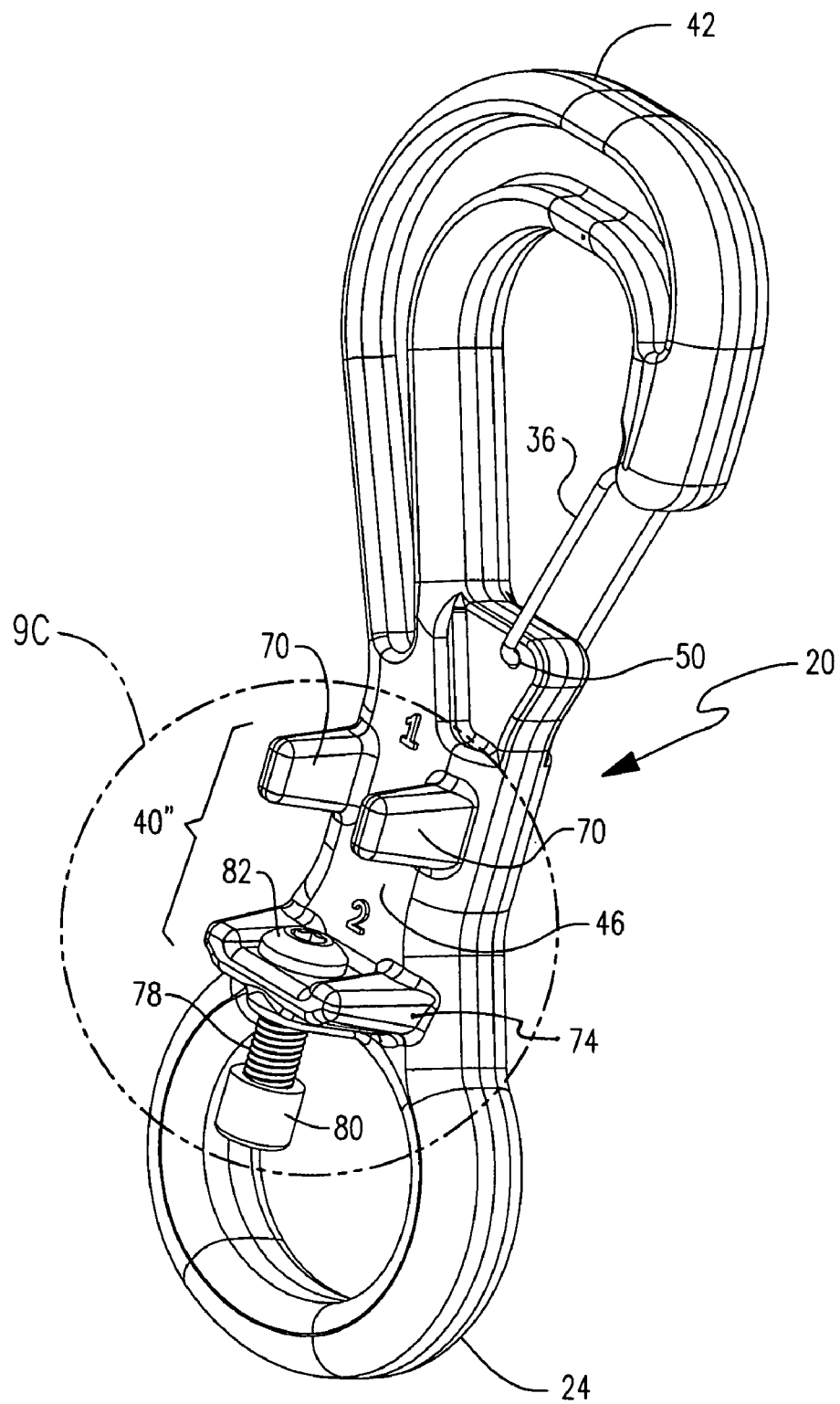
FIG. 9A is a side view of the device with an alternate arm element shown where the rope is positioned in the second position, the rope is held between portions of arm element 40" with an adjustment bolt 82 to adjust the hold of the clip on the rope passing therethrough.
Figure 9B:
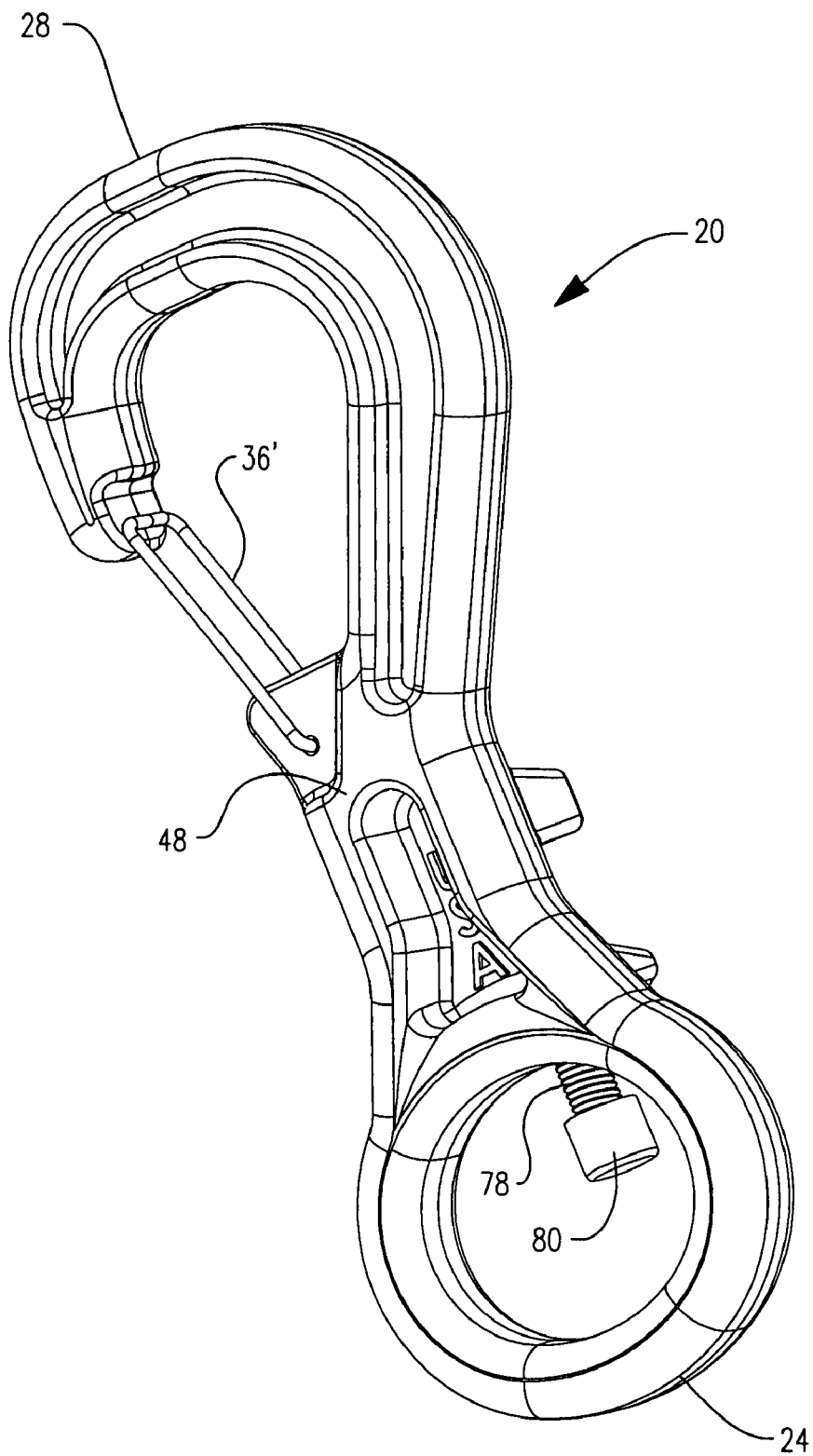
FIG. 9B is a rear view of the embodiment of FIG. 9A.
Figure 9C:
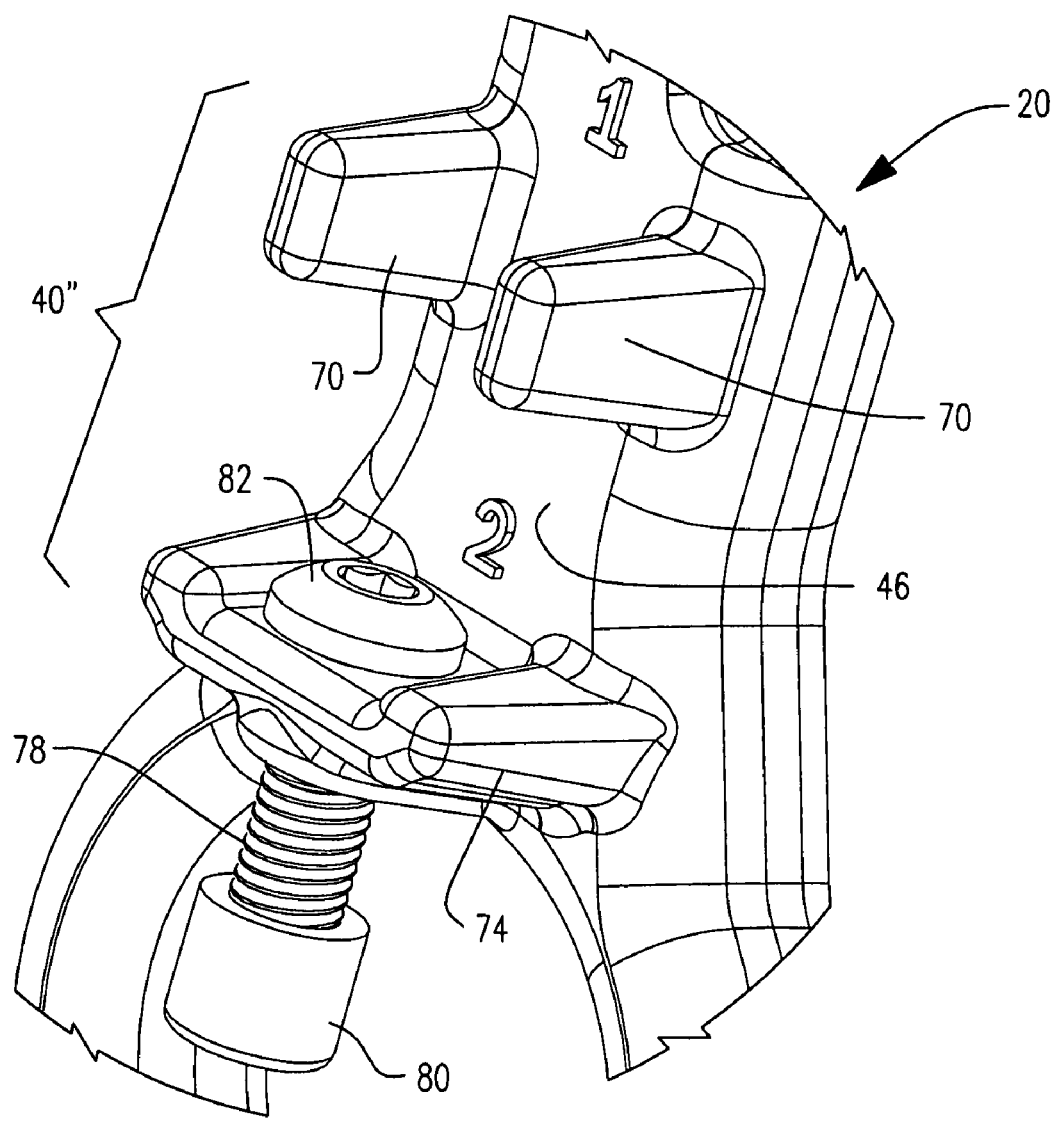
FIG. 9C is a fragmentary close-up view of the arm element 40" with parts removed for ease of understanding.

FIGS. 9 A-C illustrate an additional embodiment 20"" having a two-piece arm element 40''', the two pieces consisting of a pair of prongs 70 and a shelf 74, the shelf for receiving an adjustment bolt 78. The pair of prongs provide a shelf-like projection for use with the lead rope in a first position, yet allow the bolt 78 to be put into position within an orifice in the shelf 74. The cap 82 of the adjustment bolt 78 prevents the adjustment bolt 78 from being accidentally removed from the device 20"". Additionally, a thumb cap 80 is provided at an end opposite the cap 82 of the adjustment bolt 78 for ease of manual adjustment of the bolt 78 to narrow the space between the shelf 74 and the prongs 70 providing a range of potential adjustments to narrow the gap therebetween to hold the rope placed in a second position through the two-piece arm element of the device 20"". In this manner, different amounts of pressure are needed to pull the lead rope through the two-piece arm element 40''' when the rope is in the second position. The horse tethered to the lead rope can be anchored by the device in such a manner that the amount of pressure or pull applied by the horse can be met with varying amounts of resistance, grab or drag on the lead rope by the device, by adjusting the adjustment bolt, when the lead rope is placed in the device in the second position.

In use, the tethered animal has the lead rope attached to the device 20 in the following manner. A loop of the lead rope is placed through the handle opening 38, from front to back, in such a manner that the loop is extended over the hook end 28 such that the loop of the lead rope is then placed adjacent the arm element in one of three positions, above the arm element 40, 40'40", below the arm element or between the two parts of the two-piece arm element 40''' shown in FIG. 9A, about the handle end of the device. When the lead rope is in the first position, above the arm element 40" as shown at FIG. 6, the length of the led rope may be adjusted by manually pulling on the lead rope end opposite the attached animal to shorten by sliding the amount of lead rope available to the animal. So long as the rope clip device is anchored to something by the hook 28, this can occur manually. When the lead rope is thus positioned, some pressure must be applied to adjust the lead rope length by sliding the rope over the arm element, either to increase the amount of lead rope available or to decrease the amount of lead rope available to the animal. In this manner a horse may be granted more rope manually by the user to, for example, drink water, and then be easily pulled up short again manually to prevent the horse stepping over the rope and entangling itself. Also in this position, the animal can pull out by sliding the lead rope through the device in a controlled manner. In this way, the animal can back away if frightened but not get loose. A knot in the end of the lead rope opposite the lead shank prevents the lead rope from pulling out of the device completely. In the case of no knot being present, the animal could pull the lead rope away from the device entirely.

This would result in a loose animal but it would still have the lead rope attached, making re-capture easier.

When the tethered animal is attached to the deevice in the second position, as shown at FIG. 7, with the lead rope positioned below the arm element 40", the length could be re-adjusted manually but a greater amount of pressure would be required. It would be easier to loosen the pressure on the lead rope and re-position the loop above the arm element 40, 40', 40", as described above. In this position, the animal can pull back but a relatively greater amount of pressure must be applied before the lead rope length could be increased, for instance, if the animal fell down. This automatic release of the lead rope prevents strangulation of the animal. When the lead rope loop is positioned about the handle only, as shown at FIG. 8, the lead rope length is locked into place preventing the length to be adjusted either by the user or by the animal. In the embodiment illustrated at FIGS. 9A-C, when the lead rope loop is placed in the second position, below the pair of prongs 70 and above the shelf 74, between the two parts of the two-piece arm element 40''', the amount of "grab" or drag placed on the lead rope can be manually adjusted by use of the adjustment bolt 82. In this embodiment, the adjustment bolt 78 provides the "grab" or drag on the lead rope could range of pressure needed to slip the lead rope through the arm element 40''' from a level similar to the first position to a level similar to the third position. A thumb cap 80 provides ease of manual adjustment of the adjustment bolt 78 to narrow the space between the shelf 74 and the pair of prongs 70. This adjustment bolt 78 provides a range of pressure for potential adjustments to the lead rope placed between the pair of prongs 70 and the shelf 74. The range of pressure can be adjusted as needed to slip the lead rope through the arm element 40''' after application of pressure.

Figure 10A:
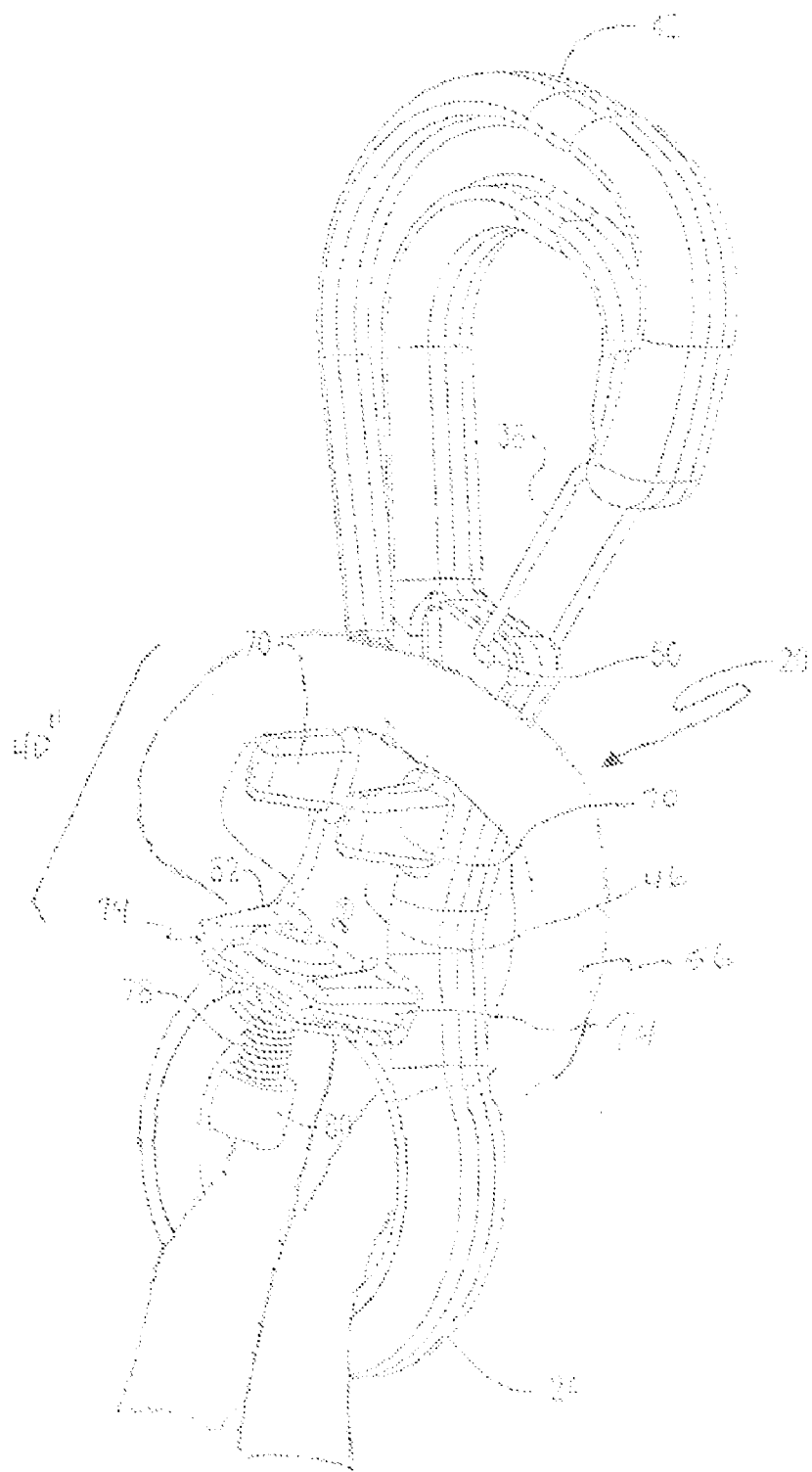
FIG. 10A is a front side view of the embodiment of FIG. 9A with a lead rope held in a first position of use above the arm element of the device.
Figure 10B:
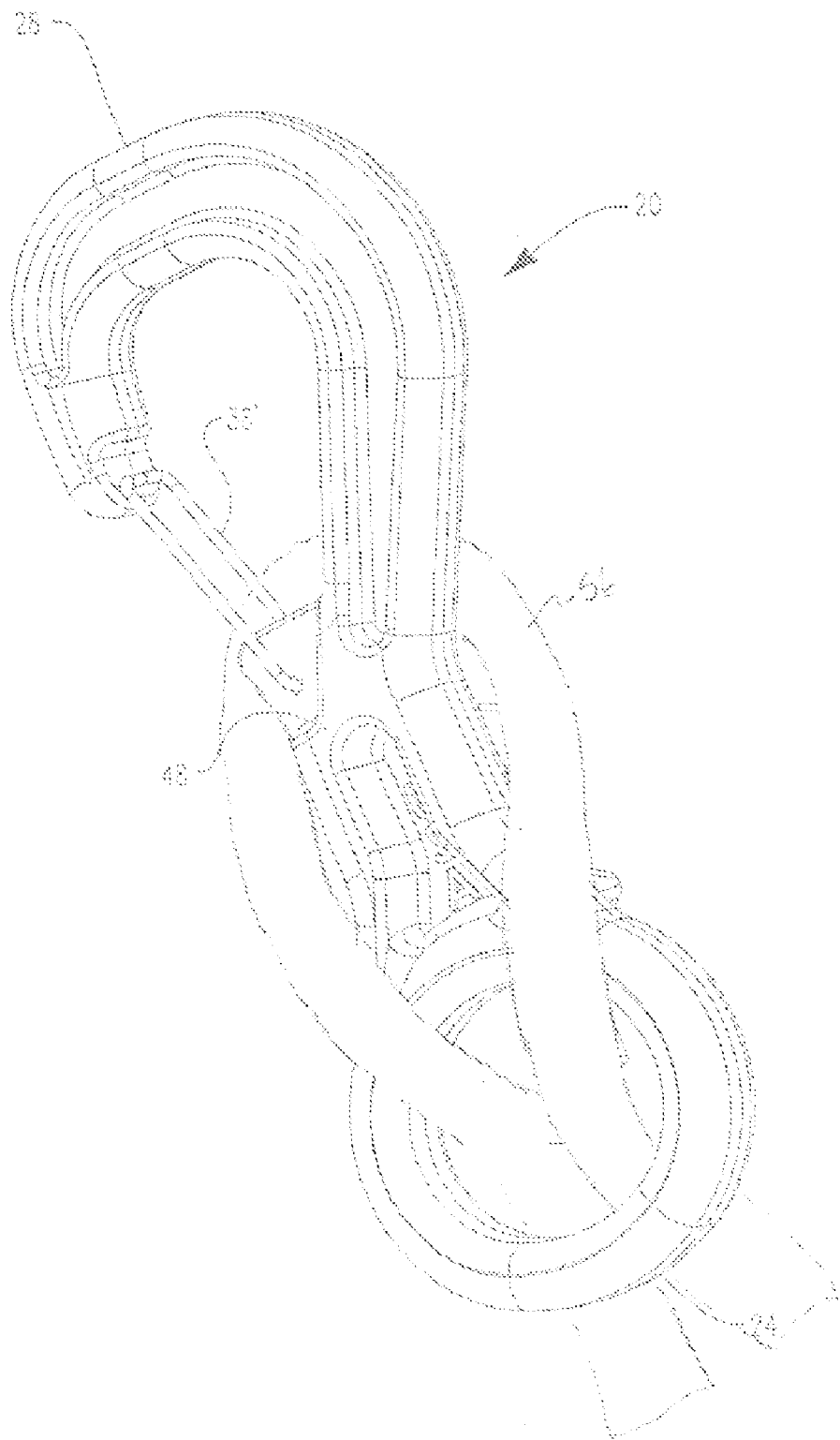
FIG. 10B is a rear side view of the embodiment of FIG. 10A with a lead rope shown positioned about the device of this invention.

FIGS. 10 A and B are included to show the device of FIG. 9 with a loop of a lead rope in a first position of use above the two-piece arm element 40" where the length of the lead rope may be adjusted by manually pulling on the lead rope end opposite the attached animal to shorten the amount of lead rope available to the animal.

Figure 11A:
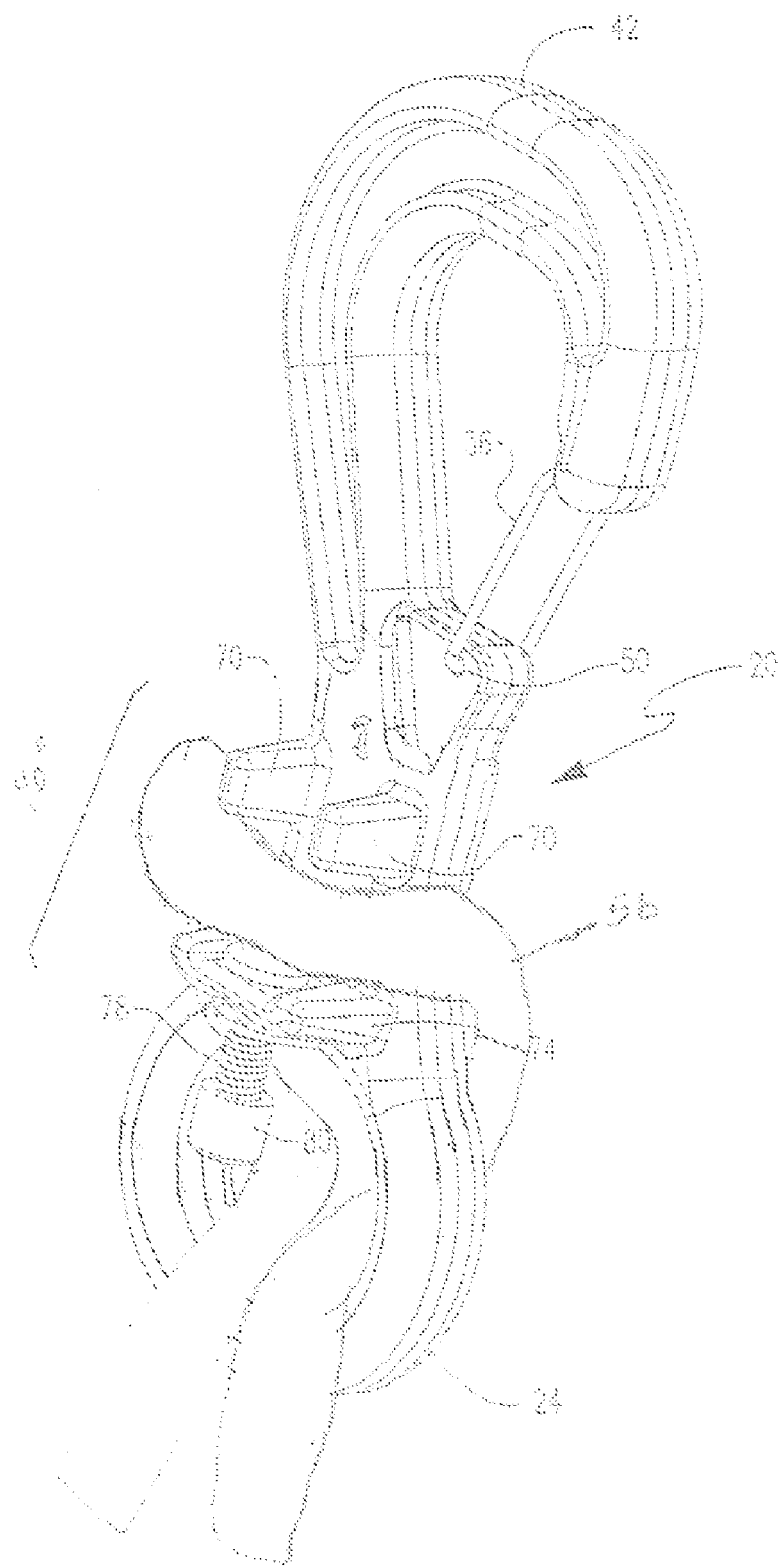
FIG. 11A is a front side view of the embodiment of FIG. 9A with a lead rope held in a second position of use within the two-piece arm element of the device.
Figure 11B:
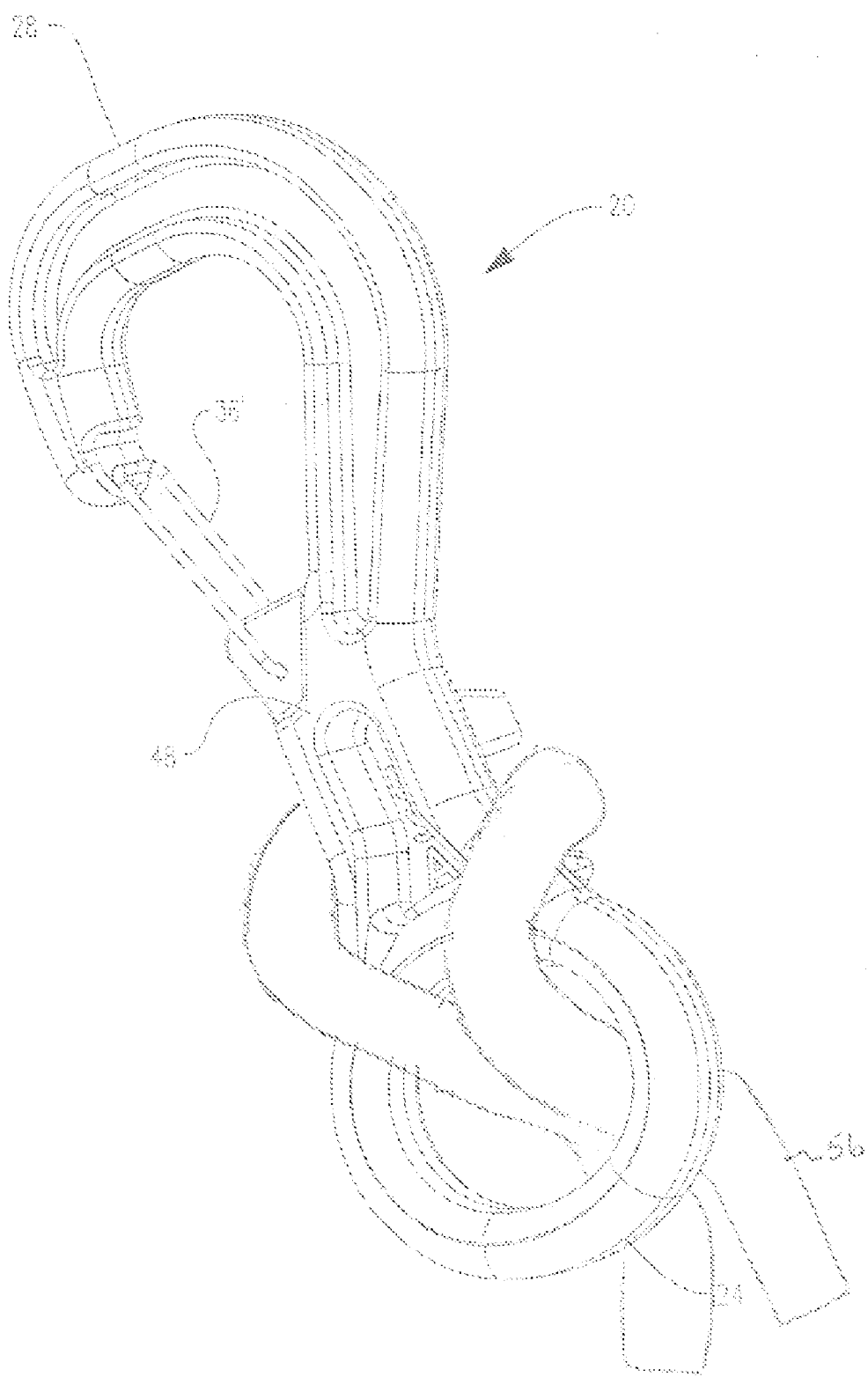
FIG. 11B is a rear side view of the embodiment of FIG. 11A with a lead rope shown position about the device of this invention.

FIGS. 11A and 13 are included to show the device of FIG. 9 with a loop of a lead rope in a second position of use within the two piece of arm element 40", specifically below prongs 70 and above shelf 74 where the amount of "grab" placed on the lead rope can be manually adjusted by use of the adjustment bolt 82. A lead rope in the third, locked, position about this tethering device embodiment is similar to that shown at FIGS. 8A and B.

Even when the rope is pulled tight with weight on the lead rope, the lead rope does not tighten into a knot. Removal of the lead rope from the clip device is still easy. Pressure on the lead rope must be removed but then the loop of the lead rope 58 can be manually re-positioned.

When the animal is tethered by means of the rope clip anchored to a fixed object, the rope clip can be detached from the fixed object with the animal still tethered to the lead rope and the animal may be lead to a new site and re-attached by means of the rope clip anew without having to un-tether the animal from the lead rope at any time. The new site can be a trailer, the side of a trailer, a picket, new cross-tie position, etc. Apparatus that would allow the securing device to detach from the fixed object while maintaining attachment to the animal for moving the animal to a different location, and especially onto a trailer, would be a distinct improvement.

Although the present invention has been described in considerable detail with reference to certain preferred versions thereof, other versions are possible, such as handles of different shapes. Therefore, the spirit and scope of the appended claims should not be limited to the description of the preferred versions contained herein.

Changes and modifications in the specifically described embodiments can be carried out without departing from the scope of the invention which is intended to be limited only by the scope of the appended claims.

What is claimed is:

1. A tethering device for use with an animal on a lead rope, for use to re-position the attached animal without the addition of other devices and without detaching the animal from the lead rope, even momentarily, comprising:
   a) a rope clip having a body, with a hook formed at one end of said body and a handle formed into the opposite end of said body, said handle having an opening formed therein for receiving a loop of a lead rope for attachment of a lead rope thereto;
   b) a spring clip element, further comprising a flat wire length of stainless steel shaped generally as a rectangle, the legs of the long sides of the rectangle having different lengths and each leg having a projecting end for receipt by a pair of bores formed in said body of the apparatus, the spring clip element attached to the hook portion of said body and temporarily closing said hook portion, for the temporary attachment of the tethering device to a fixed object; and
   c) at least one arm element extending outwardly from said body, configured and arranged to slidably engage a loop of the lead rope on said rope clip.

2. The device of claim 1, wherein said arm element further comprises means for frictional gripping of the rope when the rope is manually positioned above the arm element wherein the length of the rope may be manually slideably adjusted when pressure is removed from the rope.

3. The device of claim 1, wherein said arm element further comprises maintaining positioning, of the rope manually positioned about said arm element, by frictional forces, for permitting a predetermined length of lead rope to be selectively slidably released from said rope clip in a controlled manner upon application of pressure on the rope by the animal on the lead rope, the predetermined length determined by knotting the lead rope preventing its release from the rope clip.

4. The device of claim 1, wherein said handle receives a lead rope manually positioned thereto for locking the lead rope to said clip by positioning a loop of the lead rope about said handle.

5. The device of claim 1, wherein said arm element provides means whereby the lead rope may be manually positioned about the rope clip in one of a group of three positions including a first position, where a loop of the lead rope is positioned above said arm element for slidably adjusting the length of the rope, a second position, where a loop of the rope is positioned below said arm element yet above said handle for slidable release of the rope in a controlled manner upon pressure being applied on the rope by the animal on the lead rope-and a third position, where the rope is looped about said handle locking the lead rope in place.

6. The tethering device of claim 1, wherein said arm element further comprises a two piece arm element having a pair of prongs and a shelf for receiving the lead rope there-between, said shelf having an orifice formed therein for receiving an adjustment bolt, and wherein said adjustment bolt further comprises a thumb cap for ease of manual adjustment of said adjustment bolt, said adjustment bolt provided to narrow the space between said bolt and said pair of prongs, said adjustment bolt providing drag on the lead rope placed between said pair of prongs and said adjustment bolt.

7. A tethering device for use with an animal on a lead rope, for use to re-position the attached animal without the addition of other devices and without detaching the animal from the lead rope, even momentarily, comprising:
   a) a rope clip having a body, with a hook formed at one end of said body and a handle formed into the opposite end of said body, said handle having an opening formed therein for receiving a loop of a lead rope for attachment of a lead rope thereto:
   b) a spring clip element, attached to the hook portion of said body and temporarily closing said hook portion, for the temporary attachment of the tethering device to a fixed object:
   c) at least one arm element extending outwardly from said body, configured and arranged to slidably engage a loop of the lead rope on said rope clip;
   d) said spring clip further comprises a flat wire length of stainless steel shaped generally as a rectangle, the legs of the long sides of the rectangle having different lengths and each leg having a projecting end for receipt by a pair of bores formed in said body of the apparatus; and
   e) wherein said arm element further comprises a two piece arm element having a pair of prongs and a shelf, said shelf for receiving the lead rope there-between, said shelf having an orifice formed there for receiving an adjustment bolt.

8. The tethering device of claim 7, wherein said adjustment bolt further comprises a thumb cap for ease of manual adjustment of said adjustment bolt, said adjustment bolt provided to narrow the space between said shelf and said pair of prongs, said adjustment bolt providing drag and a range of potential adjustments to the lead rope placed between said pair of prongs and said bolt, said range of adjustments providing a range of pressure needed to slip said lead rope through said arm element after application of pressure.

9. The device of claim 7, wherein said two-piece arm element further comprises means for permitting a predetermined length of lead rope, the predetermined length determined by knotting the lead rope preventing its release from the rope clip, to be selectively released from said rope clip in a controlled manner upon application of pressure on the rope by the animal on the lead rope.

10. The device of claim 7, wherein said handle receives a lead rope manually positioned thereon and positioning the lead rope loop about said handle provides means for locking a lead rope attached to said clip.

11. A tethering device for use with an animal on a lead rope, for use for re-positioning the attached animal without the addition of other devices and without un-tethering the animal from the lead rope, even momentarily, comprising:
   a) a rope clip having a body, with a hook formed at one end of said body and a handle formed into the opposite end of said body, said handle having an opening formed therein for receiving a loop of a lead rope for attachment of a lead rope thereto:
   b) a spring clip element, attached to the hook portion of said body, for temporarily closing said hook portion, for temporary attachment of the tethering device to a fixed object, said spring clip further comprises a flat wire length of stainless steel shaped generally as a rectangle, the legs of the long sides of the rectangle having different lengths and each leg having a projecting end for receipt by a pair of bores formed in said body of the apparatus;
   c) a two-piece arm element, having a pair of prongs and a shelf configured and arranged to slidably engage a loop of the lead rope received there-between, said shelf having an orifice for receiving an adjustment bolt;
   d) an adjustment bolt, received by said orifice in said shelf, said adjustment bolt provided to narrow the space between said shelf and said pair of prongs providing a range of potential adjustments to the lead rope placed between said pair of prongs and said shelf by providing drag on the lead rope, said range of adjustments providing a range of pressure needed to slip said lead rope through said arm element after application of pressure;
   e) wherein said arm element by receiving the lead rope thereabout permits the lead rope attached to said rope clip to be easily adjusted in length when pressure on the lead rope is removed; and
   f) wherein said adjustment bolt, by producing drag on the lead rope, provides means for permitting the a predetermined length of rope to be selectively released from said rope clip in a controlled manner upon application of pressure on the rope by the animal on the lead rope.

12. The tethering device of claim 11, wherein said adjustment bolt further comprises a thumb cap for ease of manual adjustment of said adjustment bolt.

* * * * *